R. T. AND M. H. JONES.
DRIVING MECHANISM FOR VEHICLES.
APPLICATION FILED MAY 24, 1921.
1,434,706.
Patented Nov. 7, 1922.
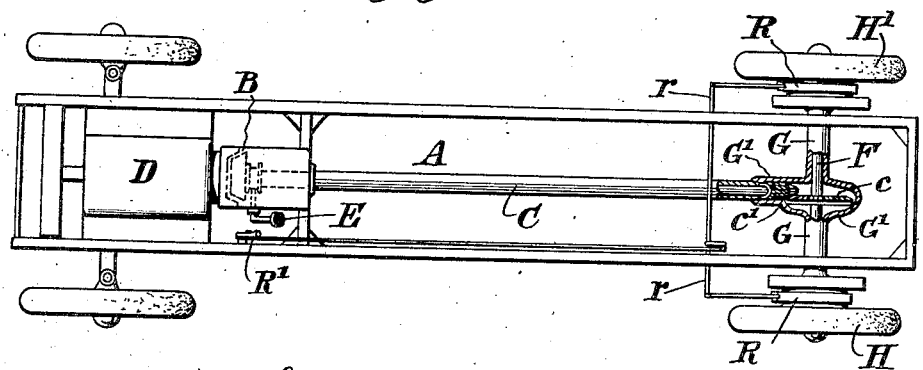
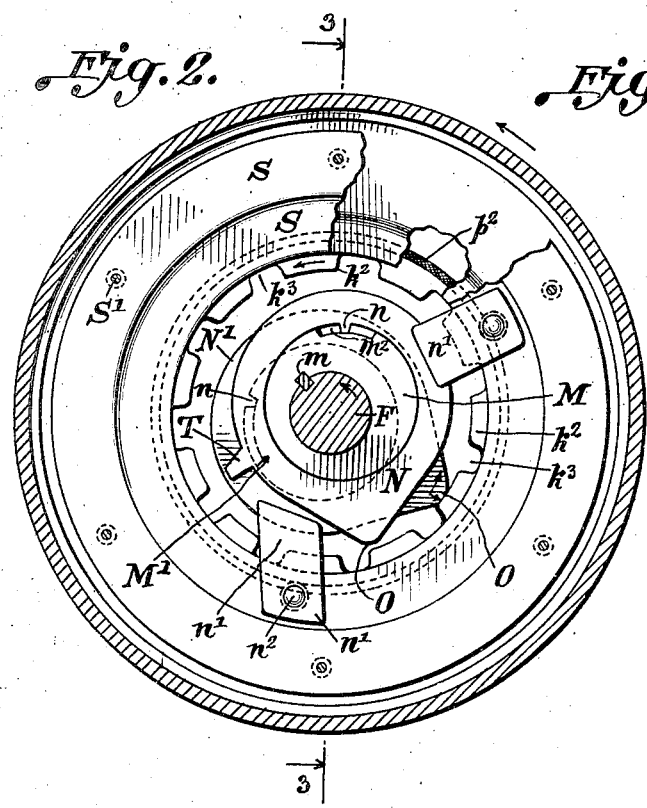
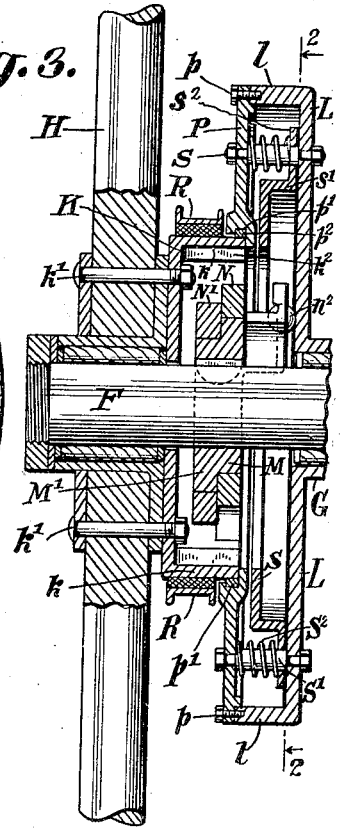
Inventors
Richard T. Jones
Madeline H. Jones
by their Attorneys R. T. AND M. H. JONES.
DRIVING MECHANISM FOR VEHICLES.
APPLICATION FILED MAY 24, 1921.

1,434,706.

Patented Nov. 7, 1922.
3 SHEETS—SHEET 3.

Inventors
Richard T. Jones
Madeline H. Jones
by their Attorneys
Baldwin Wight

Patented Nov. 7, 1922.

1,434,706

UNITED STATES PATENT OFFICE.

RICHARD T. JONES AND MADELINE HELENA JONES, OF BALTIMORE, MARYLAND.

DRIVING MECHANISM FOR VEHICLES.

Application filed May 24, 1921. Serial No. 472,046.

*To all whom it may concern:*

Be it known that we, RICHARD T. JONES and MADELINE HELENA JONES, both citizens of the United States, residing at Baltimore, in the State of Maryland, have invented certain new and useful Improvements in Driving Mechanism for Vehicles, of which the following is a specification.

This invention relates to the driving mechanism of motor driven vehicles of the kind shown in Letters Patent of the United States No. 1,330,121 granted to us on February 10, 1920. As stated in that patent the rear wheels of motor driven vehicles are ordinarily rigidly connected to the outer end of a divided axle, i. e., an axle made in two parts, each of which carries at its inner end a bevelled gear meshing with a system of gears connected to the rear end of a longitudinal shaft which is connected with the engine by a clutch under the control of a chauffeur or driver. In such a construction the gearing is at times subjected to undue strain, often causing the gears to strip or otherwise get out of order and the tires of the wheels to be injured. In taking a curve one of the wheels aften stands still or drags while the other revolves at a high speed. Furthermore in such construction there is often great wear and tear on the engine from lunging forward, coasting, etc.

The patent above mentioned describes means for overcoming these objectionable features.

According to our present invention we have simplified and improved the mechanism shown in said patent.

As in said patent we employ a solid or continuous rear axle and the driving wheels instead of being keyed to the axle are mounted to turn loosely thereon. The axle is driven from the engine by means of a shaft which is connected to the engine by a clutch under the control of the driver and said shaft is geared permanently to the rear axle by bevelled gears which are enclosed by a housing from which extend sleeves that enclose the axle. Each rear wheel is mounted loosely on one end of the axle and its hub has rigidly secured to it a flanged disk which connects with a flange projecting laterally from a disk on the end of the axle sleeve.

This construction provides housings for that part of the mechanism which connects the wheels with the axle.

Rigidly secured to the axle near each end is a pair of cams or eccentrics, and each of these cams co-operates with a ring provided with a dog adapted to engage the flange of the disk carried by the adjacent wheel hub. The arrangement is such that ordinarily or normally the wheels may be driven by the engine from the rear axle but should the wheels or either of them tend to run ahead of the engine, then the dog or dogs will be released and the wheel or wheels will revolve independently of the axle. One of the eccentrics at each end of the axle is employed for driving the car forward and the other for moving it rearward, and the arrangement is such that they do not in any way interfere with each other.

In said patent each cam ring is provided with arms carrying spring pressed balls which bear against a flange or stationary disk on the adjacent end of the axle sleeve for the purpose of holding the rings steady when the cams are first moved to cause the engagement of the dogs with the flange of the hub and also to hold the cams steady at other times until they are positively moved.

According to our present invention, instead of forming the rings with arms carrying spring pressed balls like those in the former patent, we employ a ring which surrounds the cams and which is pressed against balls carried by arms which extend radially from the cam rings. This construction has been found to be most serviceable in practice. We have also provided means for preventing the loss of oil or other lubricant in the gearing and for applying a brake to the mechanism. We have also provided a new way of limiting the movement of the cams when in operation.

In the accompanying drawings:—

Figure 1 is a plan view of so much of a motor driven vehicle as is necessary to illustrate an embodiment of our invention, some parts being shown in section.

The remaining figures are on an enlarged scale.

Figure 2 is a detail view in section, showing the driving mechanism, the section being taken on the line 2—2 of Figure 3, and with some of the parts broken away in order to better show other parts.

Figure 3 shows a section on the line 3—3 of Figure 2.

Figure 4:
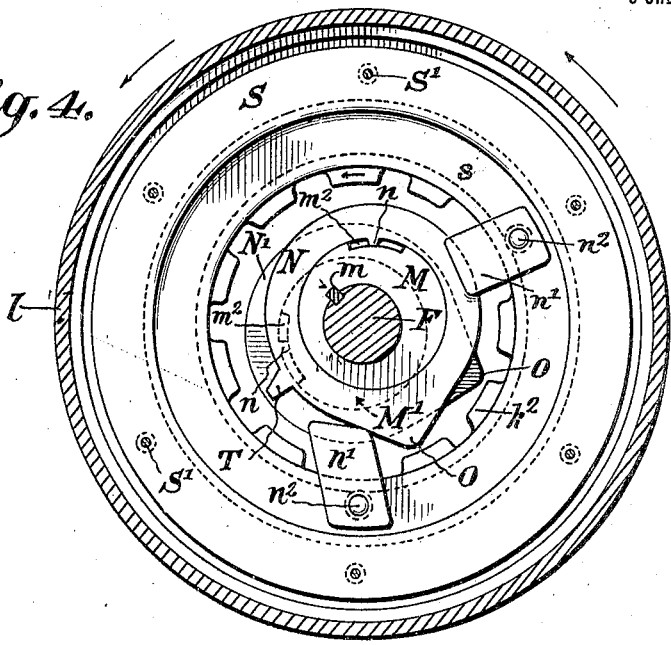

Figure 4 is a view similar to Figure 2 with the parts shifted. Figure 2 shows the position of the mechanism when driving forwards. In Figure 4 the parts are in neutral position, that is, when the mechanism is not set for either driving forwardly or rearwardly.

Figure 5:
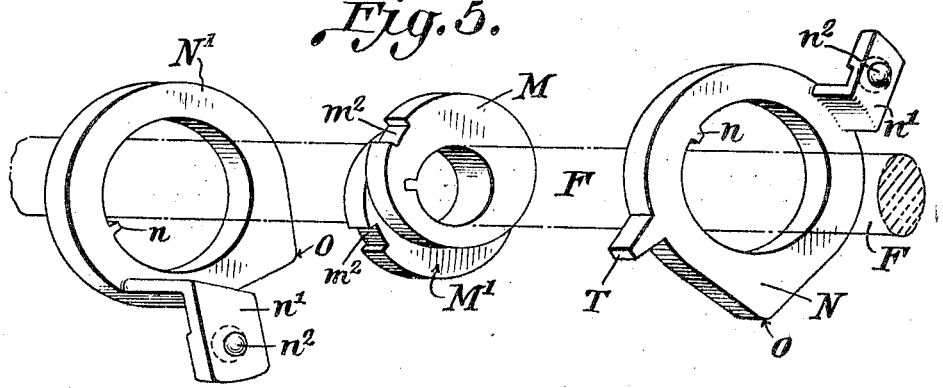

Figure 5 shows perspective views of the two cams and two eccentric rings or cam rings of the kind applied to each end of the axle.

Figure 6:
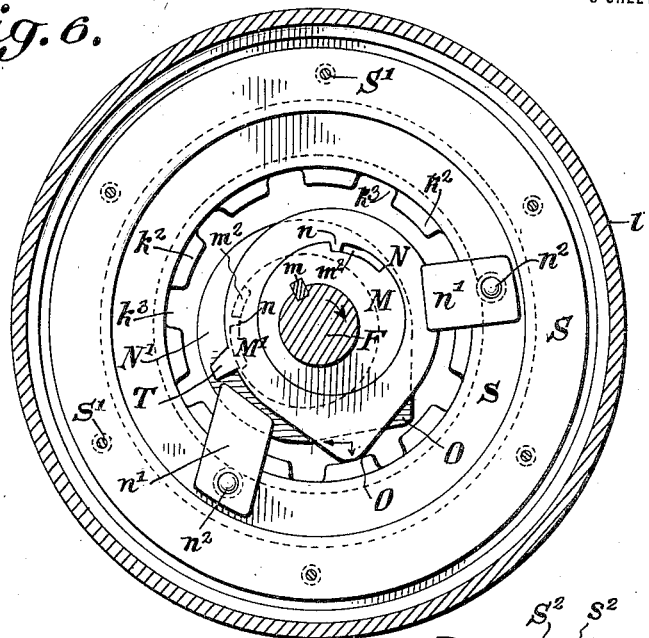

Figure 6 is a view similar to Figure 2 with the mechanism arranged to drive the wheel rearward.

Figure 7:
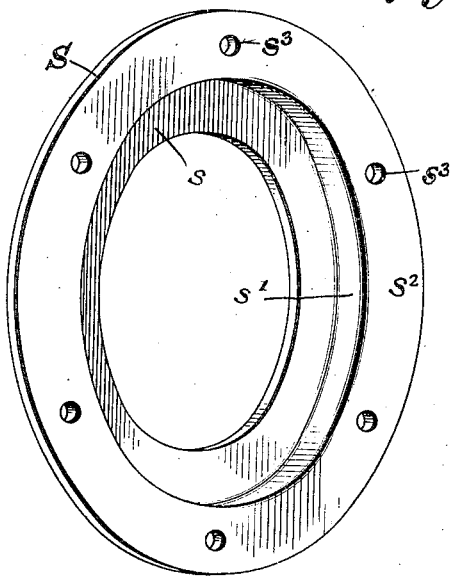

Figure 7 is a perspective view of the spring pressed ring.

Figure 8:
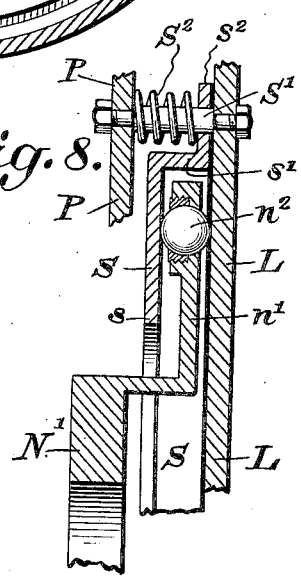

Figure 8 is a detail view in section, showing how the spring pressed ring operates upon the balls carried by the cam rings.

The frame of the vehicle is indicated at A, and B indicates clutch mechanism of well known construction which connects the shaft C with the engine D. E indicates means for controlling the clutch. The rear axle F is solid or continuous and is arranged in a suitable sleeve casing G extending from a housing G'. The shaft C is permanently connected with the rear axle by bevelled gears $c$, $c'$ surrounded by the housing G'. Each rear wheel H, H' turns freely on the axle and is held thereon in any suitable way. Each wheel hub has rigidly secured to its inner side a disk K having an inwardly extending annular flange $k$. The disk K is secured to the hub by bolts $k'$. Preferably the inside of the flange $k$ is formed with teeth $k^2$ separated by spaces $k^3$ as shown in Figure 2. Each end of the sleeve housing G is provided with a flange or disk L which extends radially from the axis of the shaft F and has an outwardly extending annular flange $l$. The disk L is of larger diameter than the disk K and the space between the flange $l$ of the disk L and the flange $k$ of the disk K is closed by an annular plate P which is bolted at $p$ to the flange $l$ and is connected with the inner end of the flange $k$ in the manner shown in Figure 3. The inner portion of the plate P is recessed at $p'$ and receives a packing ring $p^2$ which prevents lubricant from being wasted and also prevents the entrance of dust. The exterior of the flange $k$ of the disk K supports a brake strap R of usual construction and which is connected with operating mechanism $r$ shown in Figure 1, which mechanism is operated by a lever R'.

The rear axle carries near each end two eccentrics or cams M, M' and these are keyed to the axle as indicated at $m$. Each of these eccentrics or cams has for the most part a continuous cam surface, but each is formed with a recess $m^2$ for a purpose hereinafter explained. Associated with each eccentric is an eccentric ring N or N' formed on its inner side with a lug $n$ extending into a recess $m^2$ in one of the cams. Said lug is free to move in the recess to a limited extent. From the periphery of each ring extends a dog O adapted at times to engage the interior of the flange $k$ of the disk K. Each eccentric ring N is formed with or carries an arm $n'$, which is equipped with an anti-friction ball $n^2$. The arm $n'$, it will be observed (see Figure 8) extends inwardly from each cam ring and the ball $n^2$ which it carries bears against the disk L. The arm $n'$ on the cam ring N' extends past the cam ring N toward the disk L.

Mounted within the space contained between the disk L and the annular plate P is a spring pressed ring S shown in perspective in Figure 7. This ring has a radial portion $s$ which at its outer end is formed with an inwardly extending flange $s'$ which connects with a short radially extending flange $s^2$ which is perforated at $s^3$ as indicated in Figure 7 to receive bolts S' which connect the disk L with the plate P and hold them suitable distances apart. Between the disk L and the flange $s^2$ are interposed light coiled springs $S^2$ which serve to press the balls $n^2$ against the disk L and against the part $s$ of the ring. It will, therefore, be seen that the cam rings N, N' can be moved only against the spring pressure exerted by the balls on the ring S and the disk L. It will be observed that the annular plate P and the disk L are stationary, that is they do not rotate or turn while the cam rings N N' do turn and the balls $n^2$ carried by the cam rings are pressed yieldingly against the ring S and the disk L in the manner shown in Figure 8. These spring pressed balls bear at all times against the ring S and serve to prevent the eccentric rings from moving with the eccentrics or cams when the latter are first turned, i. e., when they are moved to force the dogs O radially outward into engagement with the flanges $k$. At this time the lugs $n$ move relatively to the eccentrics in the slots $n^2$ and the ball carrying arms $n'$ by reason of their engagement with the spring pressed ring S insure this relative movement. Otherwise the eccentric rings would turn with the eccentrics prematurely. Furthermore the ball carrying arms prevent the eccentric rings from slipping or turning relative to the eccentrics except when the latter are positively moved. Other forms of springs may be used.

As before stated when the shaft C is connected by the clutch B with the engine D, the rear axle is driven from the engine. When driven forward the axle will drive the wheels H, H' by the mechanism before described, which will then be disposed in the manner indicated in Figure 2. At this time it will be observed that the lug $n$ is in the rear portion of the recess $m^2$ and the dog O engages the flange $k$. When in this condition the rear wheels will be driven forward by the engine. In Figure 2 it will be observed that only one of the dogs O engages the flange k when driven forward, the other dog O being out of engagement therewith and being thus held by the ball carrying arm n' connected with the eccentric ring which carries said dog.

In the construction shown, two cams and two eccentric rings are employed, and two dogs are used to connect the cams or eccentrics with the wheel. The mechanism will remain in the condition shown in Figure 2 as long as the wheels are driven by the engine and do not tend to turn faster than the axle, but should the wheels run ahead of the engine, the dogs O which are then in engagement with the flange k will be carried forward, the lugs n moving in the recesses $m^2$. In doing this, the eccentric rings move around the eccentrics and the dogs O are withdrawn from engagement with the flanges k so that the wheels are then free to revolve faster than the axle and no strain is placed on said axle or on the engine. In Figure 4 we have illustrated a condition of the mechanism when the wheels are running forward faster than the axle and it will be observed that there is no driving connection at this time between the axle and the wheels, both dogs being out of engagement with the wheels.

When it is desired to move the vehicle rearward, the mechanism assumes the condition shown in Figure 6. In this case the inner eccentric ring is brought into operation and its dog O is in engagement with the flange k of the disk which drives the wheel. It will be understood that the mechanism on the opposite end of the axle assumes the same condition at this time. The particular clutch mechanism (B) shown forms no part of our invention and the rear axle may be driven in other ways.

While we have shown and described the invention as applied to a well known class of automobiles, it should be understood that it may be applied to motor driven vehicles of various kinds.

In the drawings T indicates a lug extending from the eccentric ring N. This lug may be used supplementary to the recesses $m^2$ and the lugs n before referred to, but in some cases it may be used in place thereof. Referring to Figure 2, it will be observed that the dog O is limited if tending to move clockwise by the adjacent arm n' projecting from the eccentric ring N' and if the eccentric ring N tends to move to too great an extent anti-clockwise, the lug T will abut against the arm n' projecting from the eccentric ring N'. In this way a certain range of movement is given to the eccentric rings about the cams or eccentrics, but this range of movement is limited in the manner before described.

It will be observed that instead of employing shallow teeth on the flange k as in the prior patent, the teeth are made deeper and fewer in number and there are spaces $k^3$ between the teeth.

The small arrows on the engaging dogs O in Figures 2 and 6 indicate the two components of motion resulting from the rotary movement of the eccentric discs at this point.

The invention herein shown and described has all of the advantages set forth in our patent of February 10, 1920 above referred to, but it also embodies some improvements in construction which have been fully and clearly hereinbefore set forth.

We claim as our invention:—

1. In driving mechanism for vehicles wherein an axle is provided and wheels loosely mounted on the axle and adapted to revolve freely thereon, a clutch mechanism for connecting a wheel to the axle comprising a flanged disc attached to the wheel, a cam attached to the axle, a ring surrounding the cam and operated thereby, a dog carried by the ring and adapted to engage said flanged disc, a spring-pressed ring surrounding the axle, and balls carried by the cam ring and engaging the spring-pressed ring.

2. In driving mechanism for vehicles wherein an axle is provided and wheels loosely mounted on the axle and adapted to revolve freely thereon, a clutch mechanism for connecting a wheel to the axle comprising a stationary disc surrounding the axle, a flanged disc secured to the wheel, cams connected to the axle and revolving therewith, cam rings surrounding the cams, and provided with dogs adapted to engage the flanged disc of the wheel, means for limiting the movement of the rings on the cams, a spring pressed ring surrounding the axle, and ball-carrying arms extending from the cam rings and engaging the spring-pressed ring.

3. In driving mechanism for vehicles wherein an axle is provided and wheels loosely mounted on the axle and adapted to revolve thereon, a clutch mechanism for connecting a wheel to the axle comprising a stationary flanged disc surrounding the axle, a flanged disc of less diameter secured to the wheel, an annular plate interposed between the stationary flanged disc and the flanged disc of the wheel, cams keyed to the axle, cam rings having a limited movement on said cams, dogs on the rings engaging the flanged disc on the wheel, bolts connecting the annular plate with the stationary disc, a spring pressed ring carried by said bolts and ball carrying arms carried by the cam rings and engaging the stationary flanged disc and the spring pressed ring.

4. In driving mechanism for vehicles wherein an axle is provided and wheels loosely mounted on the axle and adapted to revolve thereon, a clutch mechanism for connecting a wheel to the axle comprising a stationary flanged disc surrounding the axle, a flanged disc of smaller diameter attached to the wheel, a spring pressed ring carried by the stationary disc, cams keyed to the axle, rings surrounding the cams and having a limited movement thereon, dogs on the cam rings engaging the flange of the flanged disc carried by the wheel, and ball carrying arms on the cam rings engaging the spring-pressed ring.

5. In driving mechanism for vehicles wherein an axle is provided and wheels loosely mounted on the axle and adapted to revolve thereon, a clutch mechanism for connecting a wheel to the axle comprising a stationary disc surrounding the axle, a flanged disc of smaller diameter secured to the wheel and provided with dog-engaging teeth, cams connected to the axle, cam rings surrounding the cams and having limited movement thereon, dogs carried by the rings and adapted to engage the teeth of the flange, ball-carrying arms extending from the rings, a spring-pressed ring with which the ball-carrying arms engage, and a lug carried by one of the cam rings adapted to engage one of said arms.

6. A clutch mechanism for connecting a driving shaft with a driven member mounted to rotate thereon, comprising a stationary flanged disc surrounding the driving member, a flanged disc of lesser diameter carried by the driven member, cams keyed to the driving member, cam rings surrounding the cams and having a limited motion relative thereto, dogs carried by the cam rings and movable into engagement with the flanged disc on the driven member, a spring-pressed ring carried by the stationary disc, and arms on the cam rings carrying balls which engage the spring-pressed ring.

7. A clutch mechanism for connecting a driving shaft with a driven member mounted to rotate thereon, comprising a stationary flanged disc surrounding the driving member, a flanged disc of lesser diameter carried by the driven member, cams on the driving member, cam rings carried thereby but having a limited motion relative thereto, teeth on the flanged disc carried by the driving member, dogs on the cam rings to engage said teeth, a stationary spring-pressed ring, and arms on the cam rings carrying balls which engage the spring-pressed ring.

In testimony whereof, we have hereunto subscribed our names.

RICHARD T. JONES.
MADELINE HELENA JONES.